(12) United States Patent
Vinegar et al.

(10) Patent No.: US 6,824,328 B1
(45) Date of Patent: Nov. 30, 2004

(54) VAPOR COLLECTION AND TREATMENT OF OFF-GAS FROM AN IN-SITU THERMAL DESORPTION SOIL REMEDIATION

(75) Inventors: Harold J. Vinegar, Houston, TX (US); George L. Stegemeier, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/549,902

(22) Filed: Apr. 14, 2000

(51) Int. Cl.[7] .................................................. B09B 1/06
(52) U.S. Cl. .............................. 405/128.4; 405/128.6; 166/60
(58) Field of Search ...................... 405/128.1, 128.15, 405/128.2, 128.35, 128.4, 128.6; 166/75.13, 60

(56) References Cited

U.S. PATENT DOCUMENTS

| | | | |
|---|---|---|---|
| 4,704,514 A | | 11/1987 | Van Egmond et al. |
| 4,800,109 A | * | 1/1989 | Washizu ..................... 138/137 |
| 4,984,594 A | | 1/1991 | Vinegar et al. |
| 5,076,727 A | | 12/1991 | Johnson et al. |
| 5,106,232 A | * | 4/1992 | Metzer et al. ........... 405/128.2 |
| 5,114,497 A | | 5/1992 | Johnson et al. |
| 5,169,263 A | | 12/1992 | Johnson et al. |
| 5,190,405 A | | 3/1993 | Vinegar et al. |
| 5,193,934 A | | 3/1993 | Johnson et al. |
| 5,209,604 A | | 5/1993 | Chou |
| 5,217,052 A | * | 6/1993 | Sharp .......................... 141/86 |
| 5,221,827 A | | 6/1993 | Marsden, Jr. et al. |
| 5,229,583 A | | 7/1993 | van Egmond et al. |
| 5,233,164 A | | 8/1993 | Dicks et al. |
| 5,244,310 A | | 9/1993 | Johnson |
| 5,271,693 A | | 12/1993 | Johnson et al. |
| 5,318,116 A | | 6/1994 | Vinegar et al. |
| 5,348,422 A | | 9/1994 | Manchak, III et al. |

(List continued on next page.)

FOREIGN PATENT DOCUMENTS

WO     WO 98/55240     * 12/1998

OTHER PUBLICATIONS

US Army Corps of Engineers Engineering and Design "Liquid Process Piping" 1999.*
US Army Corps of Engineers Engineering and Design "Multi–Phase Extraction" 1999, chapter 5.*
Vinegar et al., "In Situ Thermal Desorption of Soils Impacted with Chlorinated Solvents," Jun. 1999, 23 pgs.
Vinegar et al., "In Situ Thermal Desorption using Thermal Wells and Blankets," May 1998, 1 pg.
Conley et al., "In Situ Thermal Desorption of Refined Petroleum Hydrocarbons from Saturated Soil," May 2000, pp. 1–10.
Hansen et al., "In Situ Thermal Desorption of Coal Tar," Dec. 1998, pp. 1–22.
Vinegar et al., "Remediation of Deep Soil Contaimination using Thermal Vacuum Wells," © 1997 Society of Petroleum Engineers, pp. 905–918.

Primary Examiner—John Kreck
(74) Attorney, Agent, or Firm—Meyertons, Hood, Kivlin, Kowert & Goetzel, P.C.; Eric B. Meyertons

(57) ABSTRACT

An in situ thermal desorption system may be used to remove contamination from soil. Off-gas removed from the soil may be transported from the soil to a treatment facility by high temperature hoses and plastic piping. The use of high temperature hose and plastic pipe may reduce the capital cost, installation cost, and operating cost as compared to conventional transport systems from thermal desorption soil remediation systems. The high temperature hose and plastic pipe are highly resistant to corrosion caused by the off-gas. The treatment facility may separate the off-gas into a liquid stream and a vapor stream. The liquid stream and the vapor stream may be processed to reduce contaminants within the liquid stream and vapor stream to acceptable levels.

30 Claims, 13 Drawing Sheets

U.S. PATENT DOCUMENTS

| | | | |
|---|---|---|---|
| 5,553,189 A | | 9/1996 | Stegemeier et al. |
| 5,656,239 A | | 8/1997 | Stegemeier et al. |
| 5,660,500 A | | 8/1997 | Marsden, Jr. et al. |
| 5,664,626 A | * | 9/1997 | Watts, III ................ 166/75.13 |
| 5,664,911 A | * | 9/1997 | Bridges et al. .......... 405/128.2 |
| 5,674,424 A | | 10/1997 | Iben et al. |
| 5,775,424 A | * | 7/1998 | Pemberton et al. ......... 166/264 |
| 5,997,214 A | | 12/1999 | de Rouffignac et al. |
| 6,044,904 A | * | 4/2000 | Shafer ..................... 166/75.13 |
| 6,102,622 A | | 8/2000 | Vinegar et al. |
| 6,146,104 A | * | 11/2000 | Mastroianni et al. ......... 417/54 |
| 6,254,524 B1 | * | 7/2001 | Kauschinger ............... 588/249 |
| 6,269,876 B1 | * | 8/2001 | De Rouffignac et al. ..... 166/60 |

\* cited by examiner

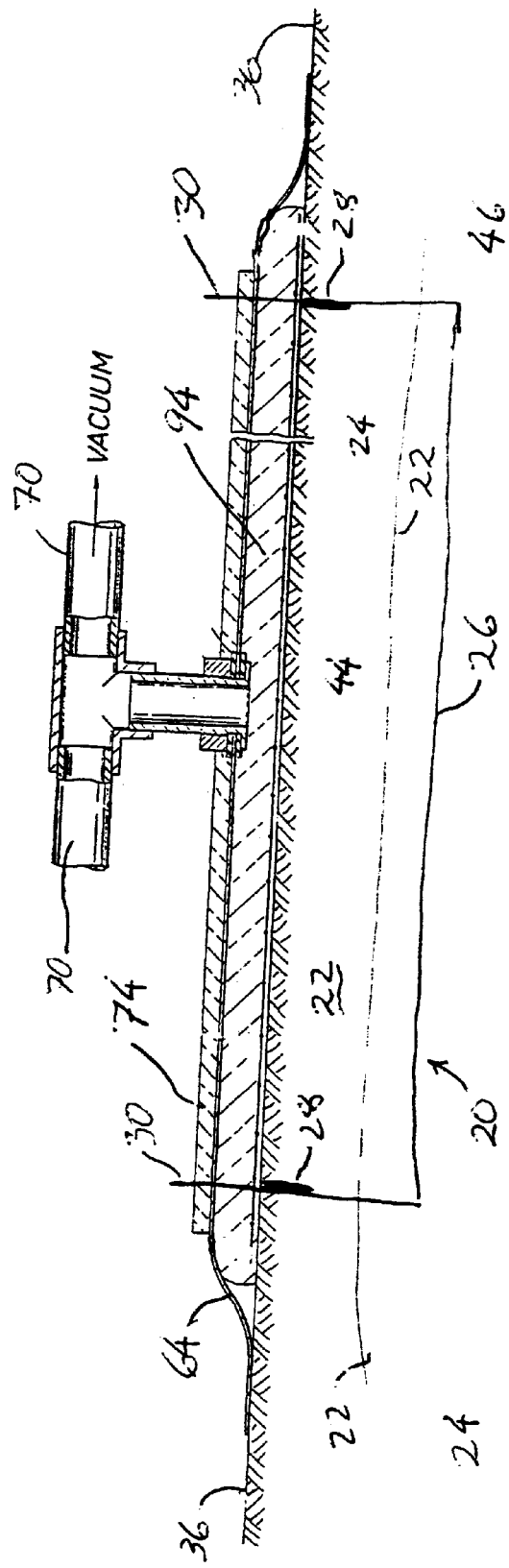

VAPOR COLLECTION AND TREATMENT OF OFF-GAS FROM AN IN-SITU THERMAL DESORPTION SOIL REMEDIATION

BACKGROUND OF THE INVENTION

1. Field of the Invention

The present invention relates generally to soil remediation, and more particularly to a vapor collection system and treatment facility for off-gas from an in situ thermal desorption soil remediation process.

2. Description of Related Art

Contamination of subsurface soils has become a matter of great concern in many locations. Subsurface soil may become contaminated with chemical, biological, and/or radioactive contaminants. Contamination of subsurface soil may occur in a variety of ways. Hazardous material spills, leaking storage vessels, and landfill seepage of improperly disposed of materials are just a few examples of the many ways in which soil may become contaminated. Contaminants in subsurface soil can become public health hazards if the contaminants migrate into aquifers, into air, or into the food supply. Contaminants in subsurface soil may migrate into the food supply through bio-accumulation in various species that are part of the food chain.

There are many methods for removal of contaminants from subsurface soil. Some possible methods for treating contaminated subsurface soil include excavation followed by incineration, in situ vitrification, biological treatment, and in situ chemical treatment. Although these methods may be successfully applied in some applications, the methods can be very expensive. The methods may not be practical if many tons of soil must be treated.

One process that may be used to remove contaminants from subsurface soil is a soil vapor extraction (SVE) process. A SVE process applies a vacuum to a well to draw air through subsurface soil. The air carries volatile contaminants towards the source of the vacuum. Off-gas removed from the soil by the vacuum may include contaminants that were within the soil. The off-gas may be transported to a treatment facility. The off-gas removed from the soil may be processed in the treatment facility to reduce contaminants within the off-gas to acceptable levels.

The permeability of the subsurface soil may limit the effectiveness of a SVE process. Air and vapor may flow through subsurface soil primarily through high permeability regions of the soil. The air and vapor may bypass low permeability regions of the soil. Air and vapor bypassing of low permeability regions may allow large amounts of contaminants to remain in the soil after a SVE process has treated the soil. Reduced air permeability due to water retention, stratified soil layers, and heterogeneities within the soil may cause regions of high and low permeability within subsurface soil.

Reduced air permeability due to water retention may inhibit contact of the flowing air with the contaminants in the soil. A partial solution to the problem of water retention is to dewater the soil. The soil may be dewatered by lowering the water table and/or by using a vacuum dewatering technique. These methods may not be effective methods of opening the pores of the soil to admit airflow. Capillary forces may inhibit removal of water from the soil when the water table is lowered. Lowering the water table may result in moist soil. Air conductivity through moist soil is limited.

A vacuum dewatering technique may have practical limitations. The vacuum generated during a vacuum dewatering technique may diminish rapidly with distance from the dewatering wells. The use of a vacuum dewatering technique may not result in a significant improvement to the soil water retention problem. The use of a vacuum dewatering technique may result in the formation of preferential passageways for air conductivity located adjacent to the dewatering wells.

Many types of soil are characterized by horizontal layering with alternating layers of high and low permeability. A common example of a layered type of soil is lacustrine sediments. Thin beds of alternating silty and sandy layers characterize lacustrine sediments. If an SVE well intercepts several such layers, nearly all of the induced airflow occurs within the sandy layers and bypasses the silty layers.

Heterogeneities may be present in subsurface soil. Air and vapor may preferentially flow through certain regions of heterogeneous soil. Air and vapor may be impeded from flowing through other regions of heterogeneous soil. For example, air and vapor tend to flow preferentially through voids in poorly compacted fill material. Air and vapor may be impeded from flowing through overly compacted fill material. Buried debris within fill material may also impede the flow of air and vapor through subsurface soil.

In situ thermal desorption (ISTD) may be used to increase the effectiveness of a SVE process. An ISTD soil remediation process involves in situ heating of the contaminated soil to raise the temperature of the soil while simultaneously removing off-gas by vacuum. In situ heating may be preferred over convective heating by the introducing of a hot fluid (such as steam) into the soil because thermal conduction through soil is very uniform as compared to mass transfer through soil. Thermal conductivity of an average soil may vary by a factor of about two throughout the soil. Fluid flow conductivity of an average soil may vary by a factor of $10^8$ throughout the soil.

Soil may be heated by radiant heating in combination with thermal conduction, by radiant by radio frequency heating, or by electrical formation conduction heating. Conductive heating may be a preferred method of heating the soil because conductive heating is not limited by the amount of water present in the soil. For soil contamination within about 2 feet of the soil surface, thermal blankets may apply conductive heat to the soil. For deeper soil contamination, heaters placed in wells may apply conductive heat to the soil. Coincident or separate source vacuum may be applied to remove vapors from the soil. U.S. Pat. No. 4,984,594 issued to Vinegar et al, which is incorporated by reference as if fully set forth herein, describes an ISTD process for soil remediation of low depth soil contamination. U.S. Pat. No. 5,318,116 issued to Vinegar et al., which is incorporated by reference as if fully set forth herein, describes an ISTD process for treating contaminated subsurface soil with conductive heating.

A conductive heat ISTD soil remediation process may have several advantages over a simple soil vapor extraction system. The heat added to the contaminated soil may raise the temperature of the soil above the vaporization temperatures of the soil contaminants. If the soil temperature exceeds the vaporization temperature of a soil contaminant, the contaminant will become a vapor. The vacuum may be able to draw the vaporized contaminant out of the soil. Even heating the soil to a temperature below the vaporization temperature of the contaminants may have beneficial effects. Increasing the soil temperature will increase the vapor pressure of the contaminants in the soil and allow an air stream to remove a greater portion of the contaminants from the soil than is possible at lower soil temperatures.

Most soil formations include a large amount of liquid water as compared to contaminants. Raising the temperature of the soil to the vaporization temperature of the water will boil the water. The resulting water vapor may volatize contaminants within the soil by steam distillation. An applied vacuum may then remove the volatized contaminants and water vapor from the soil. Steam distillation within the soil may result in the removal of medium and high boiling point contaminants from the soil.

In addition to allowing greater removal of contaminants from the soil, the increased heat of the soil may result in the destruction of contaminants in situ. The presence of an oxidizer, such as air, may result in the oxidation of the contaminants that pass through soil that is heated to high temperatures. Contaminants within the soil may be altered by pyrolysis to form volatile compounds that are removed from the soil by the vacuum.

Heating the subsurface soil may result in an increase in the permeability of the soil. A visible indication of the increase in permeability of soil may be seen in the surface of dry lake beds. As a lake bed dries, the soil forms a polygonal network of wide cracks. In subsurface soil, the creation of a network of cracks may result in enhanced vacuum driven transport within the soil. Laboratory measurements also indicate that the microscopic permeability of a dry mud is substantially greater than the permeability of the original mud. The macroscopic and microscopic increase in permeability of dried soil allows an ISTD soil remediation process to be applied to low permeability clays and silts that are not amenable to standard soil vapor extraction processes.

A typical ISTD soil remediation process may include four major components. The components may be heaters, off-gas collection piping, an off-gas treatment system, and instrumentation and power control systems.

For shallow contaminated soil, the heat may be applied to the soil by a heating blanket placed on top of the soil. Shallow contaminated soil includes soil contamination that does not extend below a depth of about 3 feet. For deeper contaminated soil, heat may be applied to the soil by heater wells.

The heat may be applied by a combination of radiant transfer and heat conduction. The heater element radiantly heats a casing, and the casing conductively heats the soil. The heating element of a heater well may be constructed from two NICHROME® wire loops. Interlocking ceramic beads may be positioned on the wire loops. The heating element may be supported on either side of a 310 stainless steel strip by small stainless steel bolts. The strip may be suspended from a carbon steel top hat inside a 3.5-inch stainless steel casing. The casing maybe sanded into a 6-inch augered hole. The casing may include a welded top flange that seals to a silicone rubber vapor barrier placed on top of the soil. Four thermocouples may be attached to the NICHROME® heating element for temperature control. A heater well may cost approximately $180 per foot to produce. The heater well may require an installation time of about 6 man hours.

In addition to the components of a heater well, a heater/suction well includes an outer 4.5-inch stainless steel screened liner and a flange above the surface flange. The additional flange connects to a vacuum manifold. A heater/suction well may cost about $240 per foot to produce. The heater/suction well may require an installation time of about 8 man hours.

A ratio of heater wells to heater/suction wells may be used during an ISTD soil remediation process. For example, an alternating pattern of heater wells and heater/suction wells may be used in a soil remediation system. Alternately, an ISTD soil remediation process may use only heater/suction wells. After remediation is complete, the wells may be pulled out of the ground with a crane. The holes may then be sealed by grouting to the surface. Often the condition of the wells after removal is poor. The wells may be corroded and/or bent. Extensive rework may be required to bring a well to a condition where it can be used again in another ISTD soil remediation process.

The off-gas collection piping may connect an array of suction wells to an off-gas treatment facility. The off-gas collection piping may include a plurality of metal, interconnected pipes. The interconnected piping may be flanged piping that requires careful alignment during installation. A crane may be used to lift and position the piping. The piping may be insulated piping that includes internal electric heaters. The insulation and the heaters prevent condensation of the vapor in the piping. The internal electric heaters require extra power supplies, wiring, and control units. Setting up the vapor collection piping constitutes a large part of the field installation cost of an ISTD soil remediation process.

A high soil temperature may destroy most of the soil contaminants before the contaminants are drawn to the surface facilities. A flameless thermal oxidizer may treat remaining contaminants within the off-gas stream. One commercial ISTD soil remediation system uses an 1800 scfm regenerative thermal oxidizer manufactured by Thermatrix Inc. of San Jose, Calif. The Thermatrix 1800 thermal oxidizer utilizes a ceramic media matrix to establish a stable and efficient reaction zone with an operating temperature range of 1800–1900° F. The Thermatrix 1800 includes about 65,000 pounds of ceramic matrix that has a high thermal inertia. A saddle type geometry of the ceramic matrix promotes efficient mixing. The Thermatrix 1800 thermal oxidizer has a guaranteed destruction efficiency for chlorinated organic compounds of 99.99+%.

During initial startup, the thermal oxidizer may be preheated with a gas burner until a desired temperature profile is created. The burner is then turned off and the temperature profile inside the thermal oxidizer is maintained by addition of fuel (propane) that is mixed with air at ambient temperature. Once a stable profile is obtained, the vapor stream is allowed to enter the oxidizer. Fuel may be added or withheld from the thermal oxidizer to maintain a substantially stable temperature profile within the thermal oxidizer. Gases leaving the thermal oxidizer may be cooled in a heat exchanger. The gases may then be passed through a carbon absorption bed for backup and polishing.

Thermal oxidizers are costly to purchase, set up, and operate. The capital expense of a vapor treatment system described above is very high (more than one million dollars). Thermal oxidizers may be large and heavy units that are expensive to mobilize. For example, the Thermatrix 1800 thermal oxidizer has an on-site footprint of about 52 feet by 8 feet. The unit has 65,000 pounds of ceramic saddles. It must be transported to the site on a separate double-drop trailer. The transportation cost to and from a soil remediation site may be $70,000 or more. A thermal oxidizer requires continuous manned operation. The thermal oxidizer unit is the principal reason for manned operation of an ISTD soil remediation process. manned operation. The thermal oxidizer unit is the principal reason for manned operation of an ISTD soil remediation process.

An ISTD soil remediation process may require a large amount of computerized instrumentation for thermal well control and temperature monitoring. A well controller may be used to control a pair of thermal wells. Each well controller may monitor heater thermocouples and control power applied to a pair of thermal wells. The well controllers may be electrically connected to a central computer over a field wide data link. Each well controller may cost about $800. Thermocouples and control wiring for the thermal wells are extensive and laborious to install, connect, and troubleshoot. Thermocouples may be driven into the soil at various locations in a region undergoing an ISTD soil remediation process to allow for temperature monitoring. The thermocouples may be polled by selected well controllers.

Well controllers enable the heater wells to apply heat to the soil at a higher rate than a steady state heat injection rate. Although a high rate can be applied at the beginning of the remediation process, the well controllers must lower the heating rate to prevent metallurgical damage to the heater wells. Thus, there may only be a small net acceleration of the heating process due to heating rate control. Moreover, the well controllers increase the chance of heater failure because they are controlling temperature at a single thermocouple location. If the thermocouple is not located at the hottest portion of a heater, the hottest portion of the heater may be maintained at an excessively hot temperature that could cause the heating element to fail.

The on-site equipment may include three trailers. The three trailers may be a process trailer, a control trailer, and an electrical trailer. The process trailer, which may contain the thermal oxidizer, heat exchangers, carbon beds and a vacuum source, may occupy approximately an 8-foot by 52-foot area. The control trailer, which contains all of the instrumentation and programming for the ISTD soil remediation system, may occupy approximately an 8-foot by 48-foot area. The electrical trailer, which provides power to the system, may occupy approximately an 8.5-foot by 48-foot area. occupy approximately an 8-foot by 48-foot area. The electrical trailer, which provides power to the system, may occupy approximately an 8.5-foot by 48-foot area.

SUMMARY OF THE INVENTION

An ISTD soil remediation process may be used to treat a region of contaminated soil. Conductive heat may be applied to the soil by a plurality of strip heaters. For low depth soil contamination, the strip heaters may be placed in trenches within the contaminated soil. For deeper soil contamination, the strip heaters may be vertically positioned in heater wells, or in combined heater and suction wells spaced throughout the contaminated soil. Vacuum sources that are coincident to or separate from the strip heaters may be applied to the soil to remove off-gas from the soil.

A strip heater may include a heater section, transition sections, and cold pins. The heater section may be formed of a high temperature, chemical resistant metal. The heater section dissipates heat when the strip heater is connected to a power source. The metal that forms the heater section may be, but is not limited to, stainless steel, incoloy®, or nichrome®. The specific metal used to form the heater section of a strip heater may be chosen based on cost, the operative temperature of the soil remediation process, the electrical properties of the metal, the physical properties of the metal, and the chemical resistance properties of the metal.

A heater section may have a large cross section area as compared to a cross sectional area of a conventional heater element. The large cross sectional area of the heater section may result in a smaller electrical resistance for the strip heater as compared to conventional heaters of equivalent length. The smaller electrical resistance allows several strip heaters to be connected in series. The ability to connect several strip heaters in series greatly simplifies the wiring requirements for an ISTD soil remediation system. The large cross sectional area of the heater section also allows a large contact area between the heater section and material placed adjacent to the heater section. The large contact area may promote dissipation of heat produced in the strip heater into surrounding soil. The heat is applied to the soil by conduction. Compared to conventional radiant heating, a heater strip may operate at a lower temperature for the same power input. Avoiding radiant energy transfer improves the reliability of the heating system.

A heater section of a strip heater may be formed with a rectangular cross sectional shape. For example, the heater section may be a 1-inch by ⅛-inch strip of stainless steel. A heater strip may be 40-feet or more in length. Strip heaters having other cross sectional shapes may also be used. A strip heater may be formed with a variable cross sectional area so that greater heat dissipation occurs at certain portions of the strip heater (sections having a smaller cross sectional area) than at other portions of the strip heater. A local high heat dissipation section of a strip may be positioned adjacent to soil that requires extra heat dissipation, such as wet soil or the top and bottom sections to counteract heat loss. A strip heater may be formed with sections that have a large cross sectional area. A large cross sectional area section of a strip heater may be placed adjacent to an impermeable section of soil that does not need to be heated by the strip heater. The cross sectional area of sections of a strip heater may be less at the top and bottom of the heater strip so that the strip heater diffuses more energy at the top and bottom of the strip heater.

Transition sections may be welded to each end of a heater section of a strip heater. Pins may be welded to the transition sections. For example, the transition sections may be 6-inch long strips of 1-inch by ½-inch stainless steel that are welded to the ends of a 1-inch by ⅛-inch 20-foot long heater section. The pins may be ⅜-inch nickel pins. The pins may extend above the soil surface when the strip heater is inserted into the soil. A mechanical Kerney lug may be used to splice the nickel pins to copper cable. The copper cable may be electrically coupled to a power source, such as a transformer. Long nickel strips may be attached to a heater section to form long unheated sections of a strip heater. Long unheated sections of a strip heater may be needed for deep soil contamination that is not near the soil surface.

A strip heater that will be used to treat deep soil contamination may be bent into a U shape. The strip heater may be placed into an augered hole. The hole may be packed with sand, gravel, or with larger sized fill material. The fill material may push legs of the strip heater against a wall of the hole. Larger sized fill material may promote off-gas flow through the fill material. The fill material may acts as a thermal transfer agent between the strip heater and the soil. The fill material may include catalyst material, such as alumina, that enhances the thermal breakdown of contaminants. A suction well may be formed by inserting a perforated casing between legs of the strip heater. Attaching the perforated casing to a vacuum source allows vacuum to remove vapor from the soil as off-gas. Positioning the casing between legs of a U-shaped strip heater allows the off-gas to pass through a high temperature zone before being removed from the soil. Passing the off-gas through the high temperature zone may result in the thermal degradation of contaminants within the off-gas.

As an alternative to placing a strip heater in an augered hole, the strip heater may be driven into the soil. A drive rod may be positioned at the center of a strip heater. The drive rod may then be pounded into the soil. When the end of the strip heater is at the correct depth, the drive rod may be withdrawn. The drive rod does not need to be a continuous rod. The drive rod may be made of threaded sections that are assembled together as the drive rod is pounded deeper into the soil. A geoprobe or a cone penetrometer rig may be used to drive the heater element into the soil. Also, a sonic rig could be used to vibrate a strip heater to a desired depth. The area between the legs of the strip heater may be filled with fill material and/or a perforated casing. The perforated casing may be attached to a vacuum source to form a suction well. The fill material may include catalyst material that enhances thermal breakdown of contaminants.

Driving or vibrating a heater strip into the soil may eliminate problems associated with disposing of cuttings formed during the formation of an augered hole. Avoidance of the production of cuttings may be particularly advantageous at extremely toxic or radioactive sites. Also, driving or vibrating a strip heater into the soil advantageously places a portion of the strip heater in direct contact with the soil to be heated.

Strip heaters may be placed horizontally in contaminated soil. Horizontally oriented strip heaters may be especially useful for treating soil contamination that extends less than about 4 feet under the soil surface. Horizontally oriented strip heaters may be placed in trenches. The trenches may be formed in the contaminated soil by a trenching machine. The horizontally oriented strip heaters may be covered with the cuttings made during the formation of the trenches. The cuttings may be tamped down on top of the strip heaters. Horizontal strip heaters may be less expensive to install than are vertical strip heaters. Trenching costs are generally less than drilling costs. Also, horizontally positioned strip heaters may be very long. Rows of strip heaters may be separated by distances equal to about twice the insertion depth of the strip heaters into the soil.

The heater section of a strip heater and the power source are designed to supply heat input into the soil that is greater than the heat input that the soil can absorb, but not enough to overheat the strip heater. An average soil may be able to absorb about 300 W/ft. A strip heater may be designed to have a maximum heat input of about 600 W/ft. The temperature that a strip heater attains is self-regulating. As the temperature of a strip heater increases, the resistance of the strip heater increases. The power source provides a substantially constant voltage to the strip heaters, so an increase in the resistance of a strip heater decreases the power dissipation of the strip heater. The application of a steady voltage to a series of heater strips may result in steady state power dissipation through the strip heaters. Heater sections of strip heaters may be sized to allow the strip heaters to attain temperatures up to about 2000° F. when energized by a power source. The strip heaters may be designed to operate at about 1600° F. A 304 stainless steel strip heater may have a resistance of about 0.08 ohms at about 1600° F.

The strip heaters may be directly connected by copper cable to a power source. The power source may be a transformer. A group of strip heaters may be connected in series to the transformer. The strip heaters may be directly connected to the transformer without well controllers or silicon controlled rectifiers.

The simple geometry of a strip heater may allow a strip heater to be produced at a cost of about $1.8 per foot. The production cost of a strip heater may result in about a 100×cost reduction as compared to the production of a conventional heater well. The production cost for a heater strip and suction well may be about $5 per foot. The production cost of a heater strip and suction well may result in about a 50×cost reduction as compared to the production of a conventional heater/suction well. Heater strips and heater strip and suction well combinations may not require external casings like conventional heater wells and heater/suction wells.

Installation costs of a heater strip in an augered hole may be greatly reduced. A conventional heater well took approximately 6 hours of time to both install in an augered hole and connect to a power supply. A strip heater may take 10 minutes or less to install and connect to a power supply. Installation costs of installing a heater strip and suction well combination may also be greatly reduced as compared to installing a conventional heater/suction well.

A collection system may connect all of the suction wells of a soil remediation system to a treatment facility. The collection system may include hoses and a vacuum manifold. The hoses may be high temperature hoses. The hose may be, but is not limited to, a high temperature rubber hose, a high temperature silicone rubber hose, or a coated rubber flexible metal hose. The system operates under vacuum; therefore, the hose needs to have structural strength that inhibits collapse of the hose. The hose may be a double walled hose or a steel reinforced hose. The vacuum manifold may be plastic piping, such as chlorinated polyvinyl chloride piping. Off-gas passing through a hose has a residence time within the hose due to the length of the hose. The residence time may be sufficiently long to allow the off-gas to cool to a temperature within the working temperature limits of the vacuum manifold piping. A hose may be from about 4-feet to over 40-feet in length.

The use of a hose and plastic piping collection system results in lower costs, simplified on-site construction, and lower mobilization costs as compared to a conventional metal piping collection system. The collection system is not insulated and heated to prevent condensation of the off-gas. This greatly reduces the cost, installation time, and operating cost of the collection system. The hose may be rolled into coils for transportation. Plastic piping may be purchased locally near the site. Hose and plastic piping are easily cut to size on-site and are connectable by solvent gluing. The need to have precise positioning of metal pipes is eliminated. Also, hose and plastic piping are lightweight and do not require machinery to lift and position during installation. For soil contaminated with chlorinated compounds, the off-gas may contain significant amounts of HCl. Unlike metal piping, hose and the plastic piping may be highly resistant to corrosion caused by the off-gas.

A treatment facility processes off-gas from the soil to substantially remove contaminants within the off-gas. A treatment facility may also provide vacuum that removes the off-gas from the soil. The treatment facility may include a condenser that separates the off-gas into a liquid stream and a vapor stream. The liquid stream and the vapor stream may be separately processed to remove contaminants. The liquid stream may be treated using a separator and an activated carbon bed. The vapor stream may be treated using an activated carbon bed or an air stripper.

The treatment facility does not require the use of a thermal oxidizer as did previous treatment facilities. Removing the thermal oxidizer from the treatment facility eliminates the large capital cost, transportation costs, and operating expenses associated with the thermal oxidizer. The elimination of the thermal oxidizer may allow the soil remediation process to be run unattended. A site supervisor may periodically check the system and perform normal maintenance functions at the site to ensure proper operation of the soil remediation system. Continuous manned operation of the in situ soil remediation process may not be required.

BRIEF DESCRIPTION OF THE DRAWINGS

Other advantages of the invention will become apparent upon reading the following detailed description and upon reference to the accompanying drawings in which:

FIG. 2 shows a representation of a heater strip horizontally inserted into soil;

Figure 1:
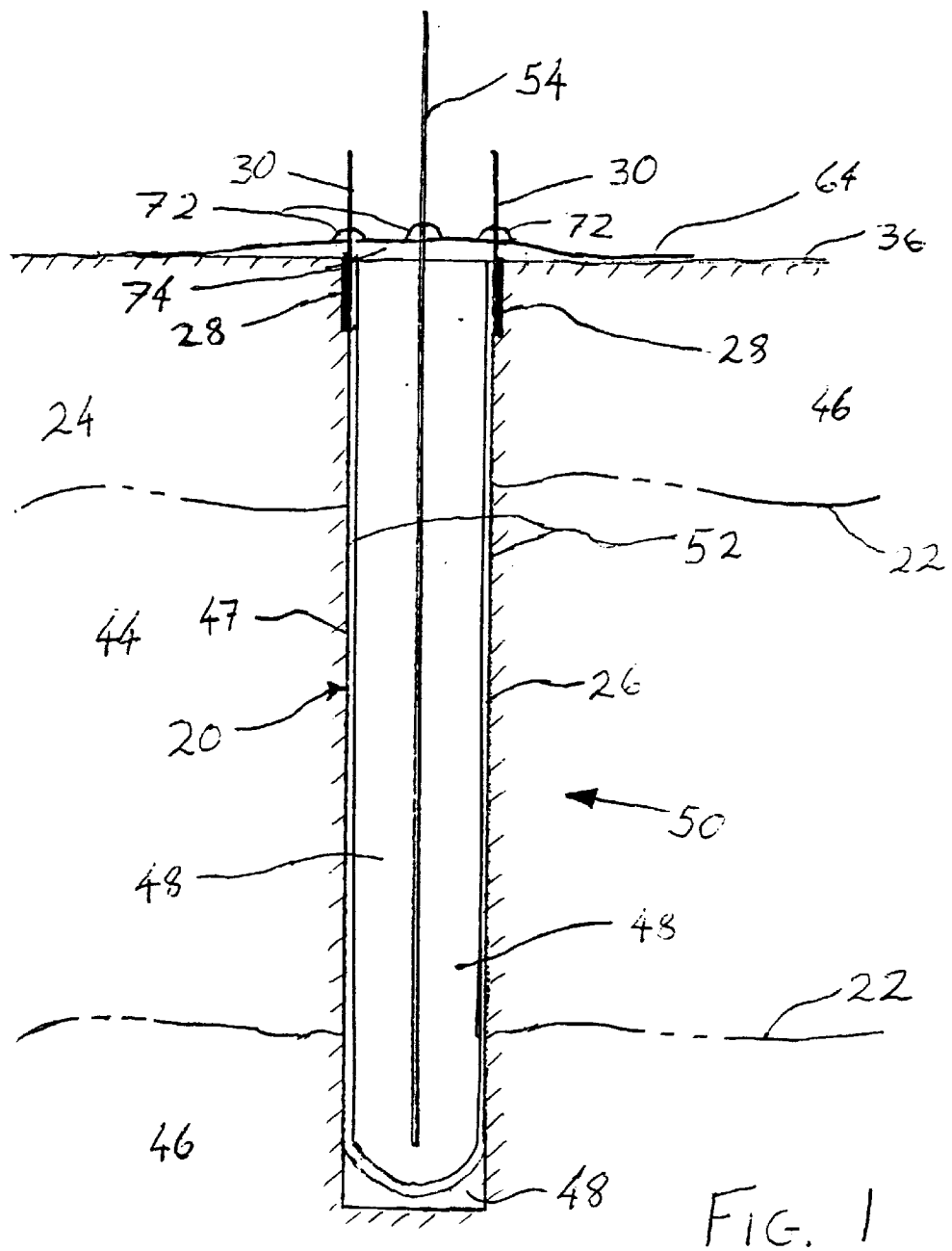
FIG. 1 shows a representation of a heater strip vertically inserted into soil.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As depicted in FIG. 1, an in situ thermal desorption soil remediation process may use strip heaters 20 to conductively apply heat to contaminated region 22 of soil 24. The soil remediation process may be used to remove contaminants from the soil 24. A vacuum may be applied to the soil 24 along with conductive heat to remove contaminants from the soil. FIG. 1 shows an embodiment of a strip heater 20 vertically positioned in contaminated soil 24. FIG. 2 shows an embodiment of a strip heater 20 horizontally positioned in soil 24. Strip heaters 20 may also be inserted in soil 24 in non-vertical and non-horizontal (e.g., angled) orientations.

A strip heater 20 may include heater section 26, transition sections 28, and pins 30. The heater section 26 may be formed of a high temperature, chemical resistant metal. The heater section 26 may be formed of a stainless steel, including but not limited to type 304 stainless steel, type 309 stainless steel, type 310 stainless steel, or type 316 stainless steel. Heater sections 26 may also be formed of other metals including, but not limited to, nichrome®, incoloy®, hastelloy®, or monel®. For example, the heater section 26 may be made of nichrome® 80 or incoloy® 800.

The specific metal used to form the heater section 26 may be chosen based on cost, the operative temperature of the soil remediation process, the electrical properties of the metal, the physical properties of the metal, and the chemical resistance properties of the metal. For example, 310 stainless steel is a high temperature stainless steel that may dissipate about 20% more power than 304 stainless steel for strips of equivalent dimensions. The corrosion resistance of 310 stainless steel is better than the corrosion resistance of 304 stainless steel. The upper working temperature limit of 310 stainless steel is about 300° F. higher than the upper working temperature limit of 304 stainless. The extra temperature range of 310 stainless steel may be used to dissipate extra heat into soil 24 and shorten remediation time. The extra temperature range may be used as a safety margin to insure against overheating the strip heater 20. The cost of 310 stainless steel may be about 25% more than the cost of 304 stainless steel. At a design stage of a soil remediation process, a determination may be made of whether the better characteristics of 310 stainless steel justify the extra cost of the 310 stainless steel above the cost of 304 stainless steel.

A heater section 26 may have a large cross sectional area as compared to conventional wire heater elements. A large cross sectional area of a heater section 26 allows a strip heater 20 to have a small electrical resistance as compared to a conventional heater of equivalent length. A small electrical resistance allows a strip heater 20 to be long. A small electrical resistance also allows several strip heaters 20 to be electrically connected in series. The ability to connect several strip heaters 20 in series may greatly simplify the wiring requirements of a soil remediation system. The large cross sectional area of a heater section 26 may provide a large contact area between the heater section and material placed adjacent to the strip heater 20. The large contact area may provide good thermal contact between the heater section 26 and the adjacent material. Good thermal contact may promote dissipation of heat produced in the heater section 26 into surrounding soil 24.

A heater section 26 may have a substantially rectangular cross sectional area. For example, an embodiment of a heater section 26 may have a 1-inch by ⅛-inch rectangular cross section and a length of about 20 feet. Cross sectional shapes other than rectangular shapes may also be used. The cross sectional shape may be, but is not limited to ellipsoidal, circular, arcuate, or square shapes. The cross sectional area and length of a heater section 26 may be designed to allow the temperature of the heater section to reach a desired temperature when power is applied to the strip heater 20.

Figure 3:
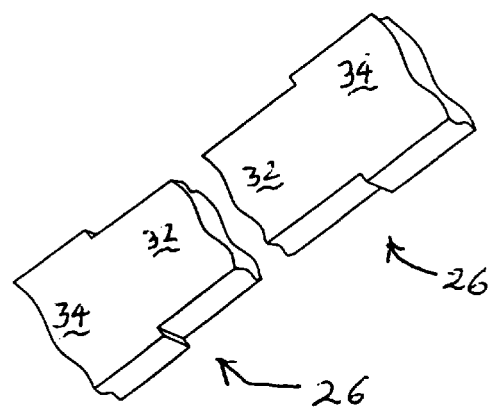
FIG. 3 is a perspective view of a portion of a heater section that has a varying cross sectional area.

A heater section 26 may be formed with variable cross sectional areas located at positions along a length of the heater section. Greater heat dissipation will occur at portions of a heater section 26 that have less cross sectional area, and less heat dissipation will occur at portions of the heater section that have greater cross sectional area. Local high heat dissipation portions of a heater section 26 may be positioned adjacent to sections of soil 24 that require extra heating, such as wet soil areas. Low heat dissipation areas of a heater section 26 may be positioned adjacent to sections of soil 24 that do not require heating, such as impermeable soil layers. Various portions of metal having different cross sectional areas may be welded together to form a heater section 26 having variable cross sectional areas. FIG. 3 shows a portion of a heater section 26 that has reduced area 32 that dissipates heat at a greater rate than adjacent areas 34.

Transition sections 28 may be welded to each end of a heater section 26. Pins 30 may be welded to the transition sections 28. For example, the transition sections 28 shown in FIG. 1 may be 6-inch long strips of 1-inch by ½-inch stainless steel that are welded to the ends of a 1-inch by ⅛-inch heater section 26. The pins 30 may be ⅜-inch diameter nickel pins. Pins 30 may extend above soil surface 36 when the strip heater 20 is inserted into the soil 24. Lugs 38 may be used to splice the pins 30 to cable 40. The cable 40 may be one conductor, 3/0 gauge, type "G" mining cable. The cable 40 may be electrically coupled to power source 42. The power source 42 may be a transformer. Long strips (not shown) of low resistance material, such as nickel, may be welded to the heater section 26 to form long unheated sections of a strip heater 20. Long unheated sections of a strip heater 20 may be needed to position heater section 26 next to contaminated soil 44 that is not near the soil surface 36.

A strip heater 20 is positioned in the soil 24. A portion of the heater section 26 may be positioned below contaminated soil 44 so that a layer of uncontaminated soil 46 is heated during a soil remediation process. The portion of the heater section 26 below the contaminated soil 44 may be one or more feet in depth. Heating a section of uncontaminated soil 46 below the contaminated soil 44 may prevent fall off in temperature at the boundaries of the contaminated region. The cross sectional area of the strip heater 20 at the bottom of the well 50 may be small so that more heat is diffused in the bottom of the strip heater. Diffusing more heat at the bottom may help to establish a more uniform temperature distribution throughout the soil treatment area.

A strip heater 20 that is not horizontally positioned in the soil 24 may be formed in a U-shape so that both strip heater pins 30 are accessible near the soil surface 36, as depicted in FIG. 2. A strip heater 20 may be inserted in opening 47 within the soil 24. In an embodiment, the opening 47 may be an augered hole. As an alternative to inserting a strip heater 20 in an augered hole, the strip heater may be driven into the soil 24. A drive rod (not shown) may be positioned at the center of a strip heater 20. The drive rod may then be pounded into the soil 24. When the strip heater 20 is inserted to a desired depth, the drive rod may be withdrawn. The drive rod does not need to be a continuous rod. The drive rod may be made of threaded sections that are assembled together as the drive rod is pounded deeper into the soil 24. A geoprobe or a cone penetrometer rig may be used to drive a strip heater 20 into the soil 24. Also, a sonic rig (not shown) may be used to vibrate a strip heater 20 to a desired depth. The sonic rig may include an eccentric cam that vibrates a strip heater 20 and a drive rod to a desired soil depth.

Driving or vibrating a strip heater 20 into soil 24 may eliminate problems associated with disposing of cuttings formed during the formation of an augered hole. Avoidance of the production of cuttings may be particularly advantageous at extremely toxic or radioactive sites. Also, driving or vibrating a strip heater 20 into the soil 24 advantageously places a portion of a strip heater 20 in direct contact with the soil to be heated.

After a strip heater 20 is inserted into the soil 24, fill material 48 may be placed adjacent to the strip heater 20 to form heater well 50. To place the fill material 48 against the heater strip 20, a pipe (not shown), such as a polyvinyl chloride pipe, may be inserted between legs 52 of a U-shaped strip heater 20. The pipe may press the strip heater 20 against the soil 24. Fill material 48 may be inserted through the pipe while raising the pipe out of the soil 24. The fill material 48 may press the strip heater 20 against the soil 24. The fill material 48 may also plug spaces between the strip heater 20 and the soil 24. The fill material 48 may include sand and/or gravel. The fill material 48 may also include catalyst material, such as aluminum oxide. The catalyst material may promote the thermal degradation of contaminants that pass through the fill material 48. The fill material 48 may be built up in a mound at the soil surface 36 to promote water runoff away from the heater well 50. Thermocouple well 54 may be positioned in the fill material 48 between the legs 52 of a U-shaped strip heater 20. A thermocouple placed in the thermocouple well 54 may be used to measure the temperature between the legs of the strip heater during an in situ thermal desorption soil remediation process.

Figure 4:
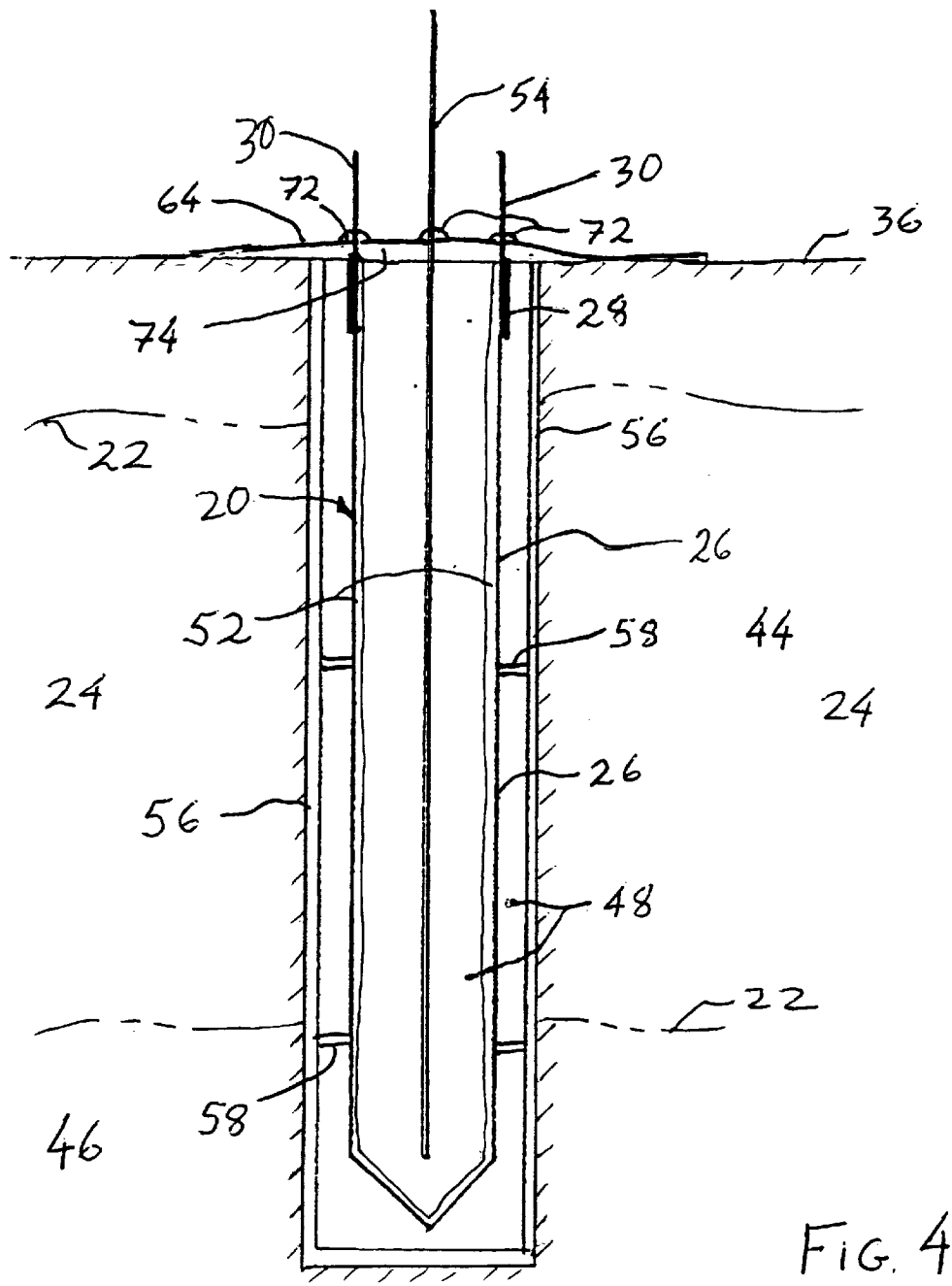
FIG. 4 shows a representation of a heater strip positioned within an external casing.

FIG. 4 shows an embodiment of a heater well 50 wherein a strip heater 20 is placed inside an external casing 56. The external casing 56 inhibits contact of the strip heater 20 with formation fluids within soil 24. The external casing 56 may be a carbon steel pipe. The strip heater 20 may be spaced away from a wall of the external casing 56 by insulated centralizers 58 positioned on the wall of the casing 56 or on the strip heater 20. The casing 56 may be packed with heat conductive fill material 48. The external casing 56 may be in thermal contact with adjacent soil 24. Selected strip heaters 20 of a soil remediation system may be placed in external casings 56 to reduce current leakage into the soil 24 from the strip heaters. Some current leakage may be acceptable because the current leakage may heat water or soil drawing current from the strip heaters 20. If excessive current leak is possible, an external casing may be used to surround the strip heater. An external casing 56 may be used when the heater well 50 is inserted in a water saturated zone, or into a brackish water. An external casing 56 may add an additional cost of about $3 per foot for a heater well 50.

Figure 5A:
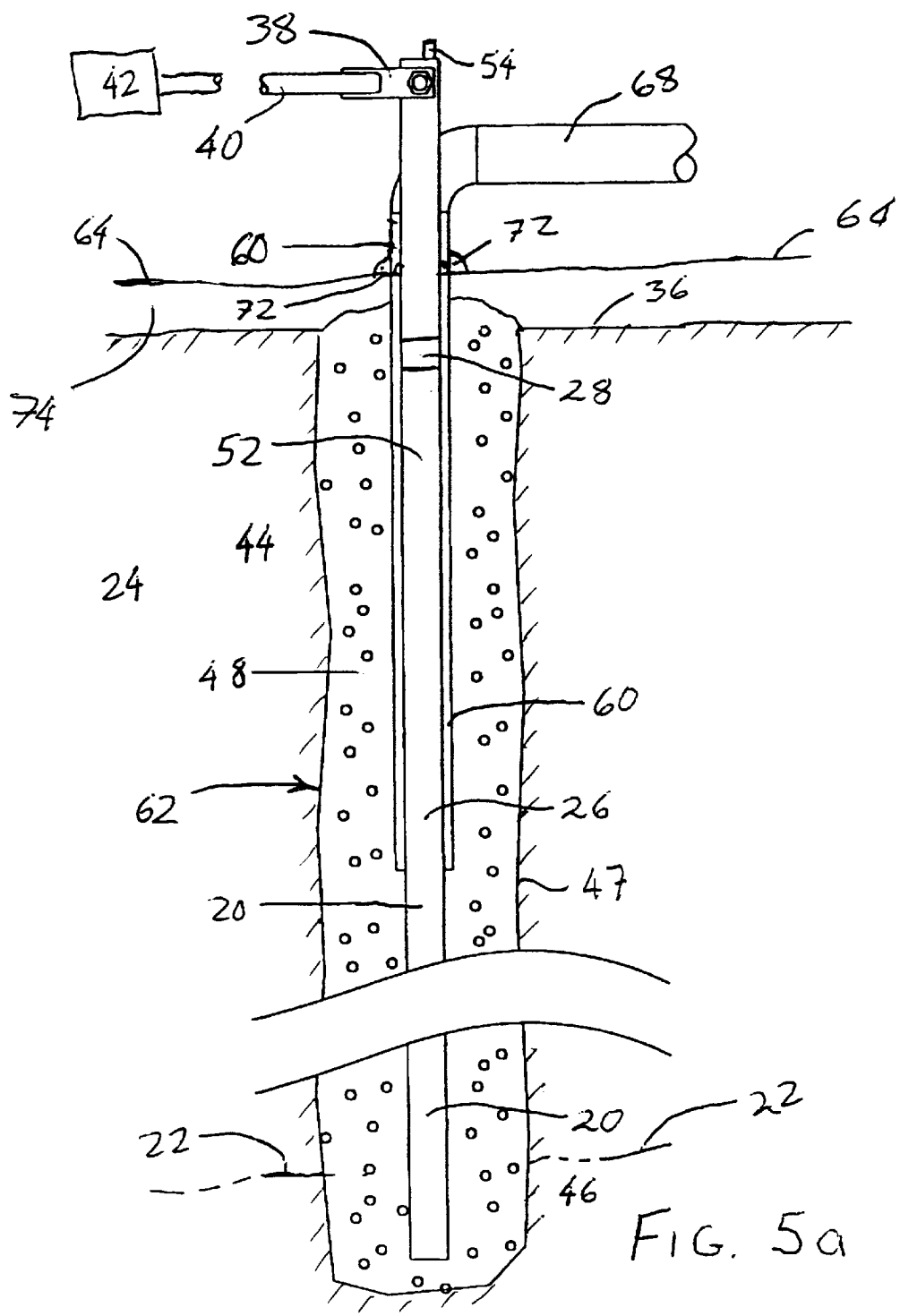
FIG. 5a shows a side representation of a heater/suction well inserted into soil.
Figure 5B:
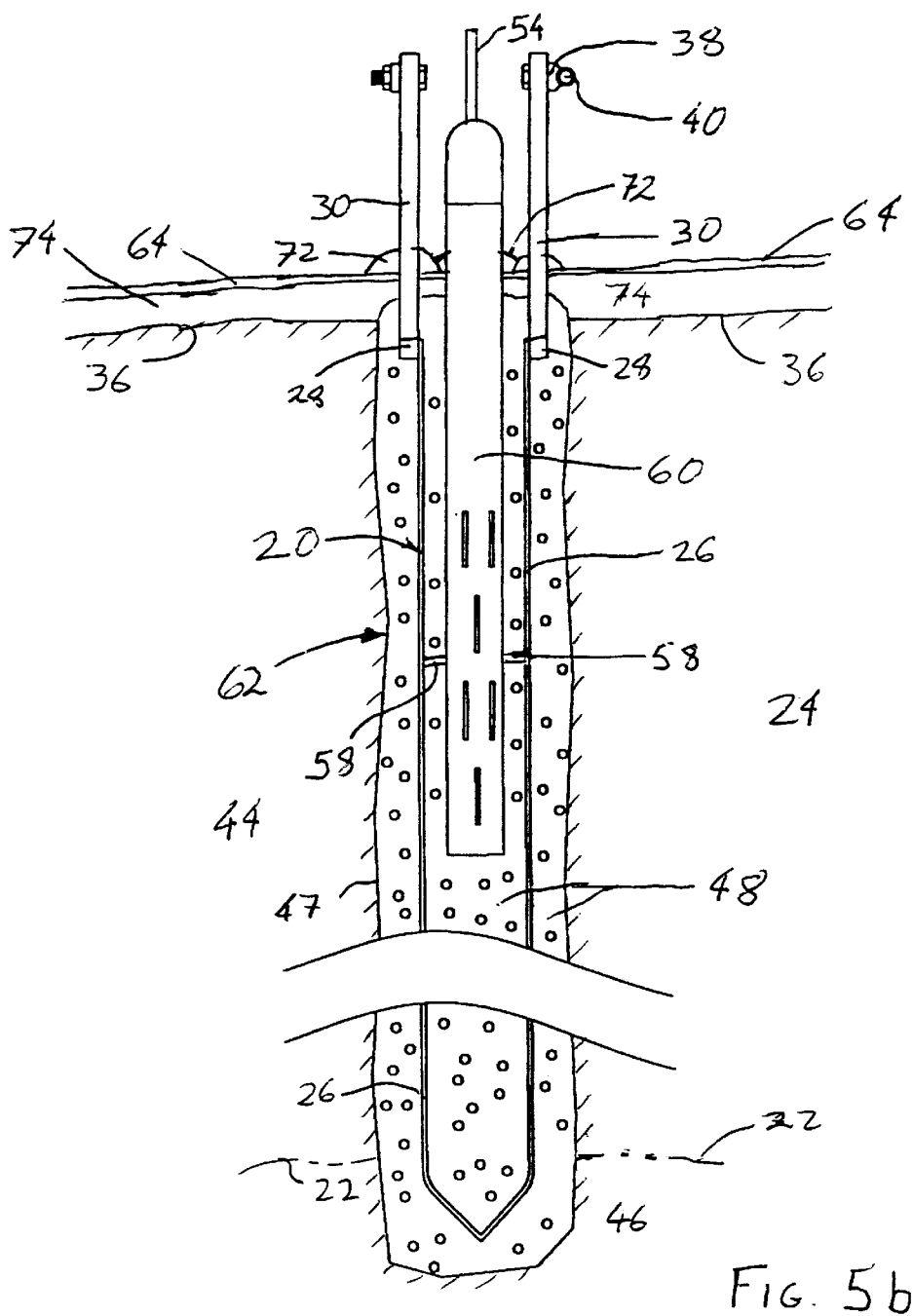
FIG. 5b shows a front representation of a heater/suction well inserted into soil.

A heater well 50 may include vacuum casing 60 positioned between the legs 52 of a heater strip 26 and separated from the heater strip by insulated centralizers 58, as depicted in FIG. 5a. A portion of the casing 60 that is positioned adjacent to contaminated soil 44 may be perforated. Perforations allow a vacuum to draw vapor into the casing 60 so that the vapor may be removed as off-gas from the soil 24. Strip heater 20 and casing 60 combinations form heater/suction wells 62. FIGS. 5a and 5b shows an embodiment of a heater/suction well 62. The fill material 48 adjacent to the casing 60 of a heater/suction well 62 may include catalyst material, such as aluminum oxide, that enhances the thermal degradation of contaminants as the contaminants pass through the fill material into the casing. As shown in FIGS. 5a and 5b, thermocouple well 54 may be inserted into the casing 60. In an embodiment, the thermocouple well 54 is ¼-inch stainless steel tubing that-is inserted into the center of a 1.5-inch stainless steel Casing 60. A thermocouple positioned within the thermocouple well 54 may be used to monitor the temperature of a strip heater 20 adjacent to the casing 60.

A strip heater 20 of a heater/suction well 62 may be placed inside an external casing 56. A vacuum casing 60 may be strapped to the outside of the external casing 56 and strip heater 20 combination shown in FIG. 4. Alternately, a large diameter vacuum casing 60 may be placed on the outside of the external casing 56 and strip heater 20 combination shown in FIG. 4. An annular space may be formed between the vacuum casing 60 and the external casing 56 containing the strip heater 20.

Figure 6:
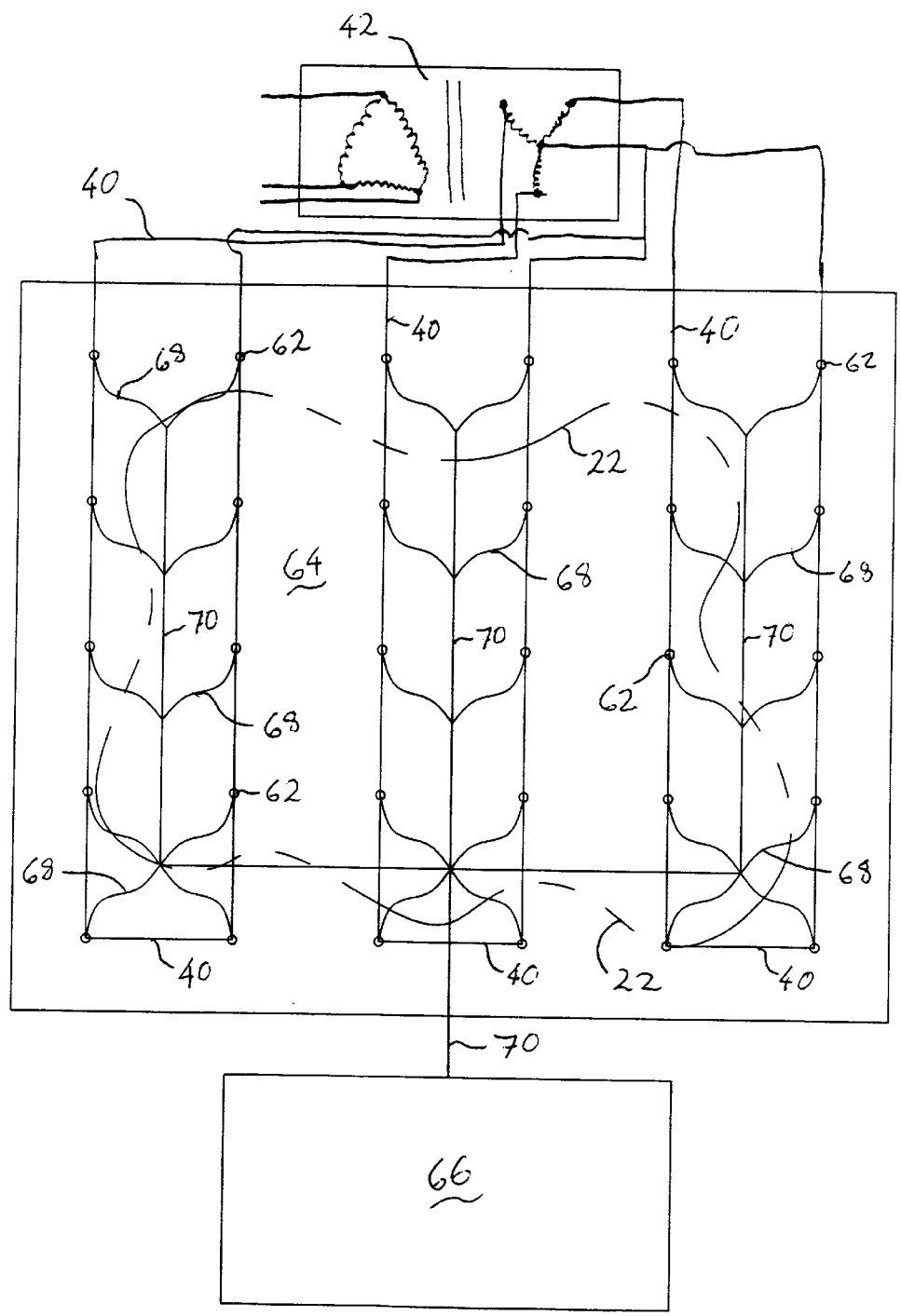
FIG. 6 shows a representation of an in situ thermal desorption system using heater/suction wells.

FIG. 6 shows a representation of an embodiment of an in situ thermal desorption soil remediation system that uses a plurality of vertical heater/suction wells 62 to treat contaminated region 22 of soil 24. The soil remediation system may include the heater/suction wells 62, impermeable barrier 64, power source 42, collection piping, and treatment facility 66. The collection piping may include hoses 68 and vacuum manifold 70. The soil remediation process may involve simultaneously applying heat and vacuum to the soil 24. Heat may be applied to the soil 24 by electrical powered strip heaters 20 positioned within the heater/suction wells 62. The heat applied by the strip heaters 20 to the soil 24 may destroy some soil contamination by thermal degradation of the contaminants. The vacuum may draw some contaminants out of the soil 24 as components of off-gas removed from the soil. The off-gas may travel through the hoses 68 and the vacuum manifold 70 to the treatment facility 66.

Impermeable barrier 64 may be placed over the remediation site. The barrier 64 may be silicone rubber sheeting. If the contaminated soil 44 is not near the soil surface 36, and if the strip heaters 20 are placed some distance below the soil surface, it may be possible to avoid high surface temperatures. If the soil surface 36 temperature is low, then a low temperature material such as polypropylene sheeting or polyethylene sheeting may be used as the impermeable barrier 64. Sealant 72 may be applied around each portion of a well 62 that extends through the barrier 64. Strip heater pins 30 and vacuum casings 60 may extend through the barrier 64. The barrier 64 may limit the amount of air drawn into the soil 24 during a soil remediation process.

Thermal barrier 74 may be placed under or on top of an impermeable barrier 64. FIG. 1 shows a thermal barrier 74 placed under an impermeable barrier 64. The thermal barrier 74 may inhibit heat loss from the soil surface 36. The thermal barrier 74 may inhibit melting and thermal degradation of the impermeable barrier 64. The thermal barrier 74 may also inhibit vapor that seeps out of the soil 24 from condensing on the impermeable barrier 64. The thermal barrier 74 may be mineral or cotton wool, glass wool or fiberglass, polystyrene foam, or aluminized mylar.

A power source 42 used to heat the strip heaters 20 may be a three phase transformer. For example, the power source 42 may be a 112.5 kVA transformer that has a 480 VAC 3-phase primary and a 208 VAC 3-phase secondary. Each phase may be used to power a group of strip heaters 20 that are electrically connected in series. If more than three groups of strip heaters 20 are needed to treat a soil contamination region 22, sections of the contamination region may be sequentially treated, or additional power sources may be used to treat the entire region at one time. The strip heaters 20 may be directly coupled to the power source 42 without the use of well controllers or silicon controlled rectifiers. The strip heaters 20 and the power source 42 are designed so that the strip heaters heat to a desired temperature when connected to the power source. The strip heaters 20 may be designed to heat to a temperature that is about 2000° F. The strip heaters may be designed to have a steady state operating temperature of about 1600° F.

Off-gas drawn from the soil 24 by vacuum may pass through the hoses 68 and the vacuum manifold 70 to the treatment facility 66. The hoses 68 may attach to vacuum casings 60 of a well 62 and to the vacuum manifold 70. The casing 60 may extend through the impermeable barrier 64. Sealant 72, such as silicone rubber sealant, may be used to seal casings 60 to the barrier 64 to preserve the integrity of the barrier.

A hose 68 may be attached to each vacuum casing 60 and to the vacuum manifold 70 by solvent glue and/or clamps (not shown), or by other attachment methods including, but not limited to, threading or flanges. The hoses 68 may be formed of high temperature rubber that has an upper working temperature limit of about 450° F. The hoses 68 are conduits for transporting off-gas from the casings 60 to the vacuum manifold 70. Off-gas passing through a hose 68 has a residence time within the hose. A hose 68 may have a sufficient length so that the residence time of off-gas within the hose is sufficiently long to allow the off-gas to cool. The off-gas may cool within the hoses 68 to a temperature that is at or below an upper working temperature limit of the material that forms the vacuum manifold 70.

A vacuum manifold 70 may be formed of plastic piping. The plastic piping may be chlorinated polyvinyl chloride (CPVC) piping or other plastic piping that has a high upper working temperature limit. The upper working temperature limit of CPVC pipe is approximately 200° F. Off-gas flowing through the vacuum manifold 70 may continue to cool. Portions of the vacuum manifold 70 located away from the vacuum casings 60 may be formed of plastic piping, such as PVC piping, that has a lower working temperature limit than CPVC piping.

The use of a collection system including hoses 68 and plastic piping vacuum manifold 70 may result in lower costs, simplified on-site construction, and lower mobilization costs as compared to a metal piping collection system. The collection system is not insulated and heated to prevent condensation of the off-gas. This greatly reduces the cost, installation time, and operating cost of the collection system. The hose 68 may be rolled into coils for transportation. Plastic piping may be purchased locally near the site. Hose 68 and plastic piping are easily cut to size on-site and are connectable by solvent gluing. Also, hose 68 and plastic piping are lightweight and do not require machinery to lift and position during installation. Unlike some metal piping, hose 68 and the plastic piping may be highly resistant to corrosion caused by the off-gas.

Figure 7:
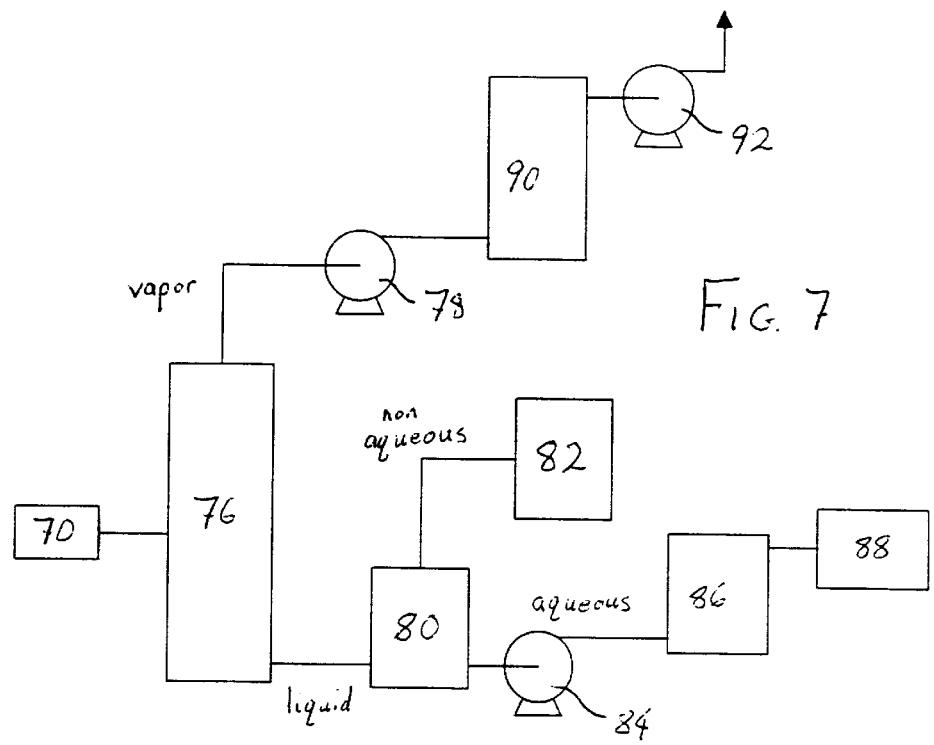
FIG. 7 shows a diagrammatic representation of a treatment facility.

FIG. 7 shows a representation of an embodiment of a treatment facility 66. Off-gas from the vacuum manifold 70 may pass into separator 76. The separator 76 may separate the off-gas into a liquid stream and a vapor stream. Vacuum system 78 that is in-line with the vapor stream may provide the vacuum to the soil 24 that removes off-gas from the soil. The vacuum system 78 should be capable of pulling a vacuum appropriate for the particular combination of soil permeability and geometry of the wells. The vacuum system 78 may be able to pull a vacuum in the range of 0.1 to 14.6 psi. The vacuum pump may be a water-sealed vacuum pump.

The liquid stream and the vapor stream may be processed to reduce contaminants within the streams to acceptable levels. Monitoring equipment (not shown) installed in the treatment facility 66 may determine the quantity of contaminants in the processed streams. The monitoring equipment may sound an alarm if too much contamination is discharged from the treatment facility 66.

The liquid stream may be separated by second separator 80 into a non-aqueous stream and an aqueous stream. In an embodiment, the second separator 80 and the separator 76 may physically be a single unit. The non-aqueous stream may include oils and other non-aqueous material. The non-aqueous stream may be very small compared to the aqueous stream. The non-aqueous stream may be sent to treatment unit 82. The treatment unit 82 may place the non-aqueous stream in storage containers, such as waste barrels. The containers may be transported off-site for disposal. Alternately, the treatment unit 82 may be an oxidization system that destroys the non-aqueous stream.

Pump 84 may transport the aqueous stream through activated carbon bed 86. The activated carbon bed 86 removes contaminants from the aqueous stream. The remaining aqueous stream may then be discharged. For example, after passing the aqueous stream through the activated carbon bed 86, the aqueous stream may be sent to sanitary sewer 88.

The vapor stream from the separator 76 may pass through treatment unit 90. The treatment unit 90 may be an activated carbon bed. The activated carbon bed removes contaminants from the vapor stream. Alternately, the treatment unit 90 may be a stripper that removes contaminants from the vapor stream. Blower 92 may draw the vapor stream through the treatment unit 90 and vent the remaining vapor to the atmosphere.

Figure 8:
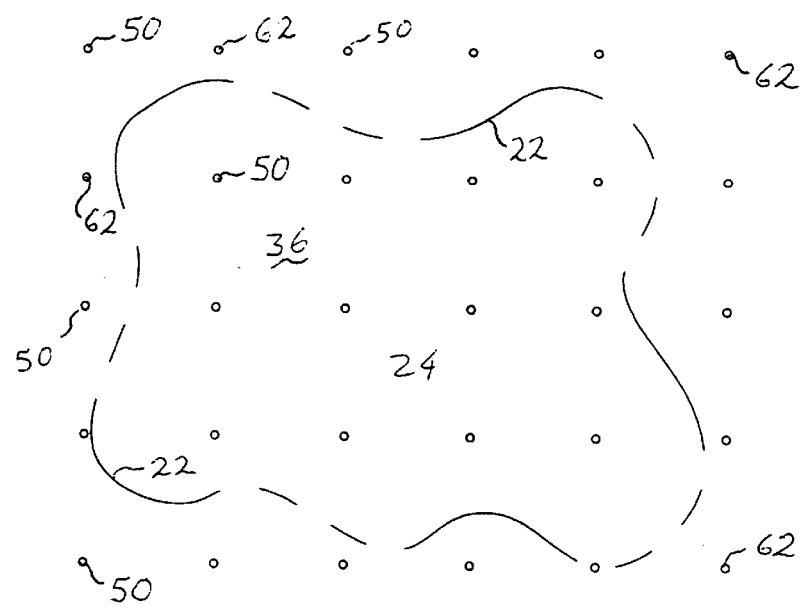
FIG. 8 shows a representation of a square well pattern layout using alternating heater wells and heater/suction wells.

The wells shown in FIG. 1 are heater/suction wells 62. The heater/suction wells 62 may be used to both heat the soil 24 and remove off-gas from the soil. The off-gas may be removed from the soil by vacuum produced by the treatment facility 66. In alternate embodiments, a well may be only a heater well 50. FIG. 8 shows a square well placement pattern wherein the wells are alternately heater/suction wells 62 and heater wells 50. Other embodiments may use other ratios of heater wells 50 to heater/suction wells 62. In other embodiments, some wells may be only suction wells (not shown).

Figure 9:
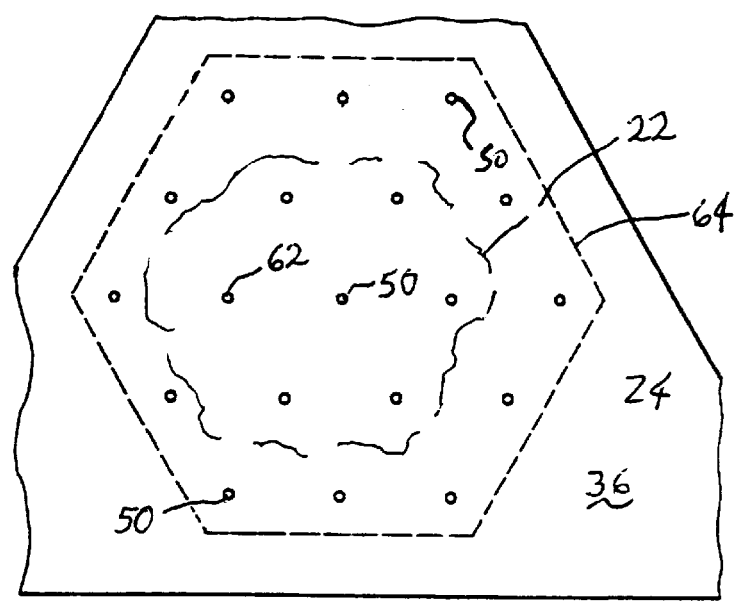
FIG. 9 shows a representation of a triangular well pattern layout.

The wells shown in FIGS. 6 and 8 are placed in a square pattern. Other regular or irregular well positioning patterns may be used to meet the particular needs of a soil remediation site. Examples of other regular patterns that may be used include triangular patterns, rectangular patterns, or hexagonal patterns. For example, wells may be placed in a triangular pattern as shown in FIG. 9. The outer wells and the center well may be heater wells 50 and the other wells may be heater/suction wells 62. Triangular and hexagonal well patterns may closely conform to circular or oval-shaped contamination areas. Square and rectangular patterns may closely conform to property lines. Irregular patterns may be used to avoid underground obstructions, to concentrate several wells in a highly contaminated soil region, or to meet other particular needs of a soil remediation system.

Figure 10:
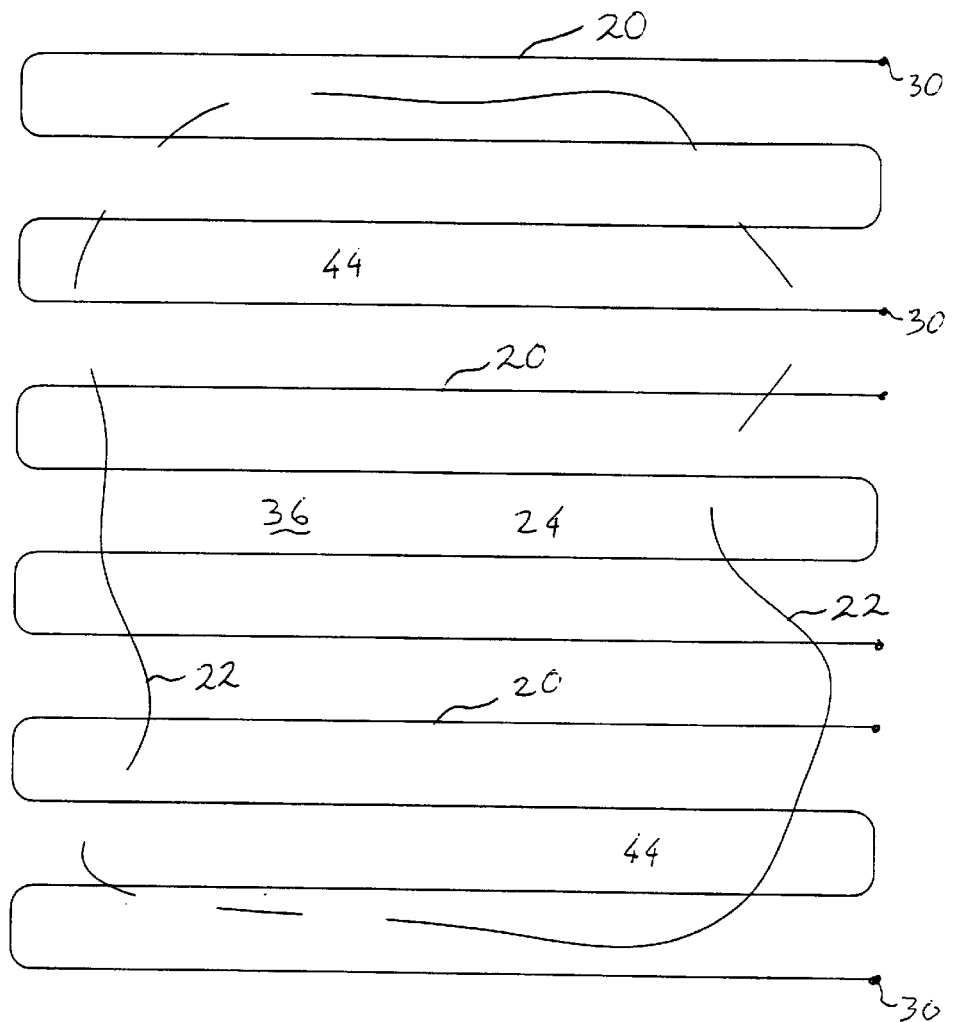
FIG. 10 shows a representation of a horizontal strip heater placement pattern.

FIG. 10 shows a horizontal layout pattern for three strip heaters 20. A horizontally positioned strip heater 20 may be placed in a trench that was previously formed by a trenching machine. After the strip heaters 20 are positioned within trenches and electrically coupled a power source 42, the cuttings formed when making the trench may be tamped down on top of the strip heaters. Horizontally positioned strip heaters 20 may be used to treat low depth soil contamination that is within about 4 feet of the soil surface 36. Horizontally positioned strip heaters 20 may be have long lengths that span across a contaminated region 22 of soil 24. Rows of strip heaters 20 may be separated by distances equal to about twice the insertion depth of the strip heaters into the soil 24.

As shown in FIG. 2, a horizontally positioned strip heaters 20 may be placed below contaminated soil 44. Vacuum applied to the soil 24 by a treatment facility 66 may be applied near the soil surface 36. Permeable mat 94 may be placed on top of the soil surface 36, and an impermeable barrier 64 and a thermal barrier 74 may be placed on top of the mat. The mat 94 may serve as a conduit for flow beneath the impermeable barrier 64. In an embodiment, the mat 94 may be a thin layer of high permeability sand or other granular material. The mat 94 may include catalyst material that enhances thermal degradation of contaminants that pass through the mat. The mat 94 may allow off-gas to flow out of the soil 24 to a vacuum manifold 70 positioned above the mat. The off-gas may flow even when the vacuum draws the impermeable barrier 64 against the mat and compresses the mat. Alternately, suction wells (not shown) may be inserted into the soil 24 throughout the treatment site to draw off-gas from the soil. The suction wells may be coupled to hoses 68, a vacuum manifold 70, and a treatment facility 66.

To implement an in situ thermal desorption soil remediation process, strip heaters 20 may be placed in the soil 24 at the remediation site. For low depth soil contamination, the strip heaters 20 may be horizontally positioned in the soil 24. For deeper soil contamination, the strip heaters 20 may be vertically positioned in the soil 24. Suction wells may be positioned throughout the soil remediation site. Some or all of the suction wells may be coincident to the strip heaters 20.

A thermal barrier 74 may be positioned over the remediation site. Suction well casings 60 and the strip heater pins 30 may be pushed through the thermal barrier 74. An impermeable barrier 64 may be positioned over the thermal barrier 74. Suction well casings 60 and strip heater pins 30 may be pushed through the impermeable barrier 64. Sealant 72 may be applied to each break in the impermeable barrier 64 to seal the barrier to the strip heater pins 30 and to the suction well casings 60.

The suction well casings 60 may be attached to a vacuum system 78 of a treatment facility 66. The vacuum system 78 may be engaged to begin removing off-gas from the soil 24. Off-gas from the soil 24 may be treated by the treatment facility 66 to reduce contaminants within the off-gas to acceptable levels.

Groups of strip heaters 20 may be electrically connected together in series. Each group of strip heaters 20 may be connected to a power source 42. When the strip heaters 20 are connected to a power source 42, the power supplied to the strip heaters 20 will heat the heater sections 26 of the strip heaters 20. The heat may conductively transfer to the soil 24. The heat may enhance removal of contaminants from the soil 24. The soil remediation system may be run for months or longer.

Treatability studies of laboratory soil samples indicate that removal of contaminants from soil may be a function of both temperature and time. A long operation time favors removal of contaminants that may have time dependent thermal desorption mechanisms. Heating times for natural soils may be longer than vaporization or desorption times for contaminants. Thus, complete removal of contaminants may be effected if the soil is heated to an adequate temperature. The adequate temperature may be the boiling point of the contaminant. For partly water soluble contaminants, an ultrahigh remediation goal may only be obtainable if pore water within the soil is boiled.

Figure 11:
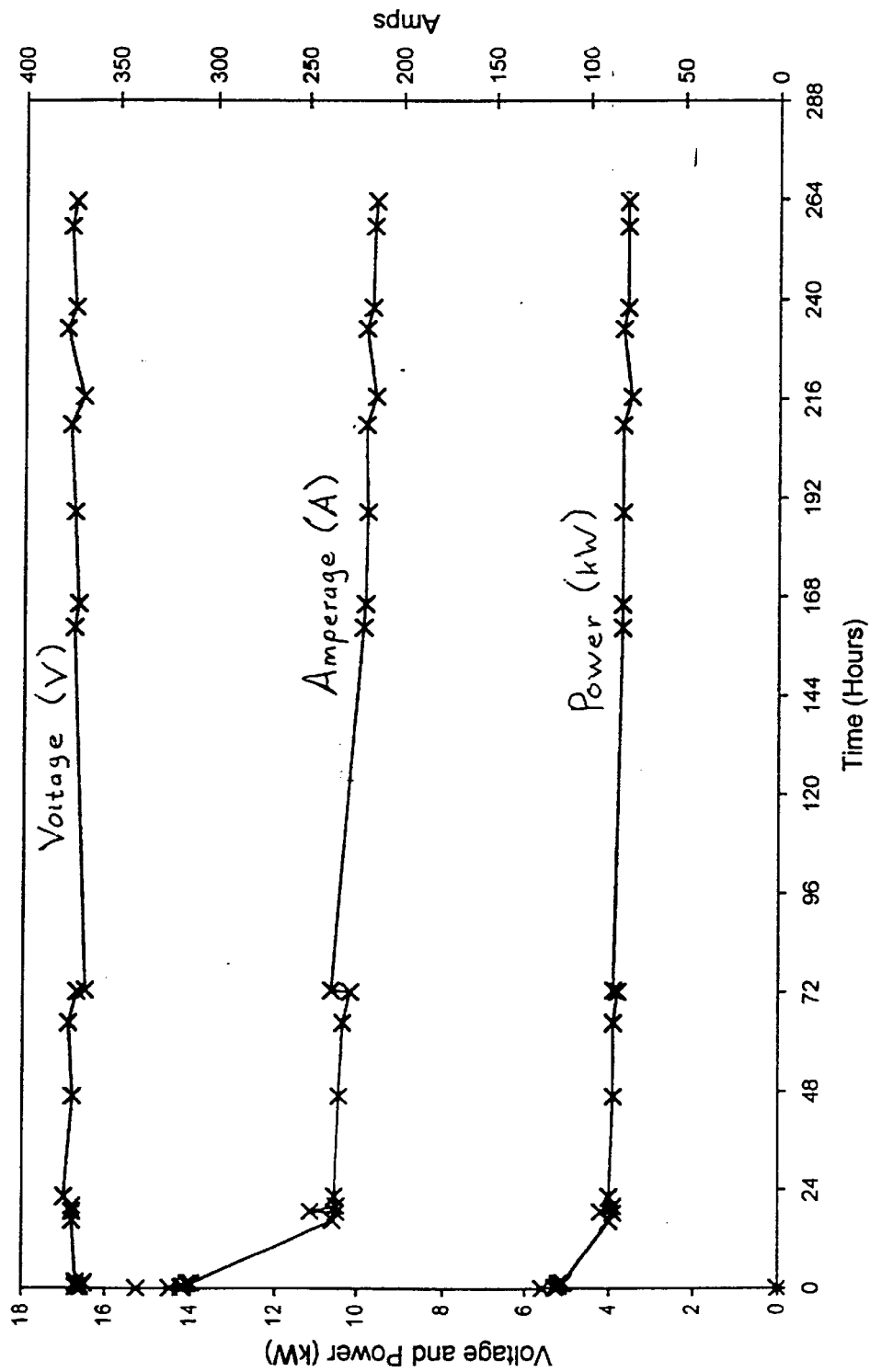
FIG. 11 shows voltage, amperage, and power data for a strip heater as a function of time.
Figure 12:
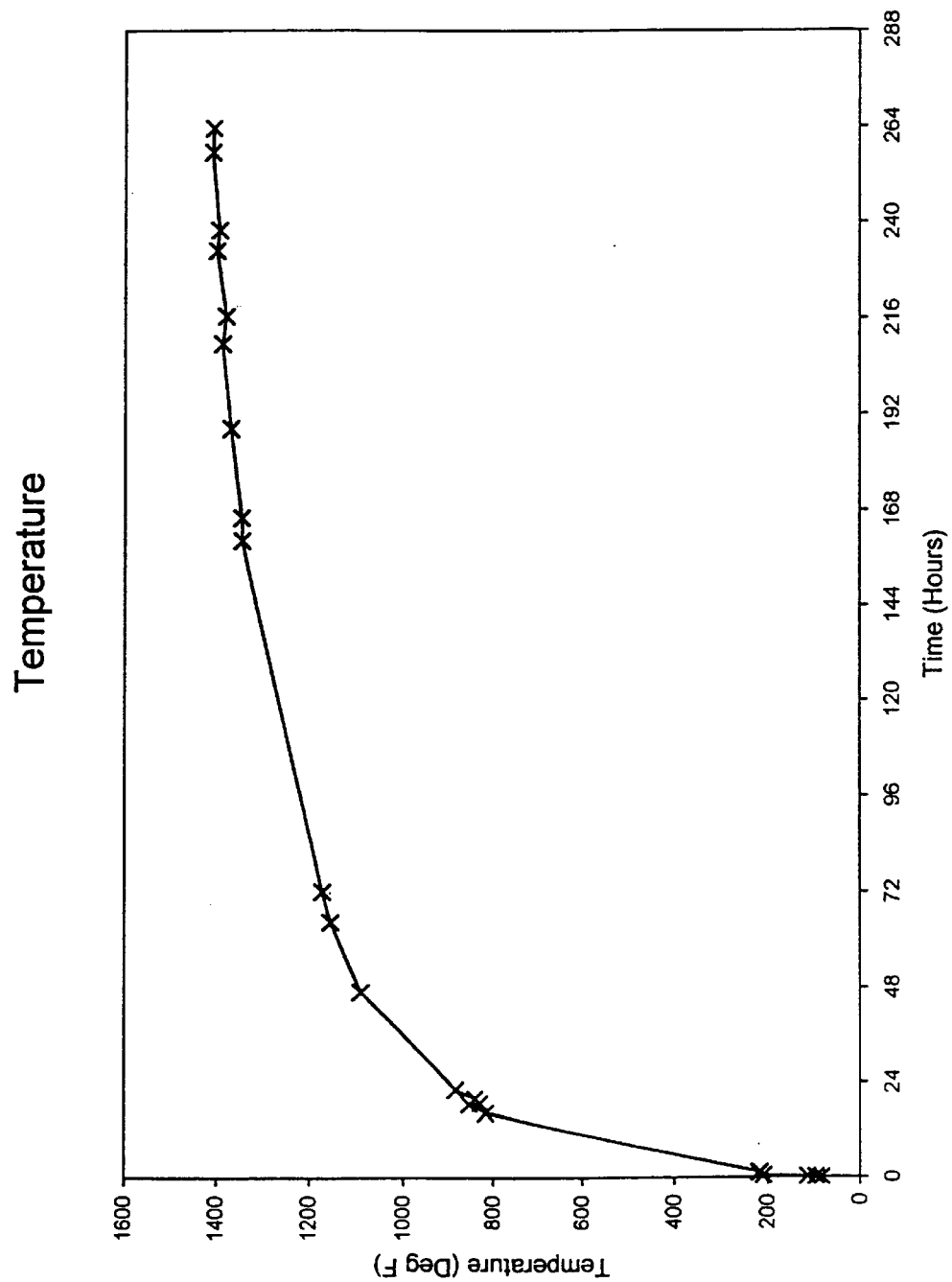
FIG. 12 shows temperature data for the strip heater of FIG. 11 as a function of time.
Figure 13:
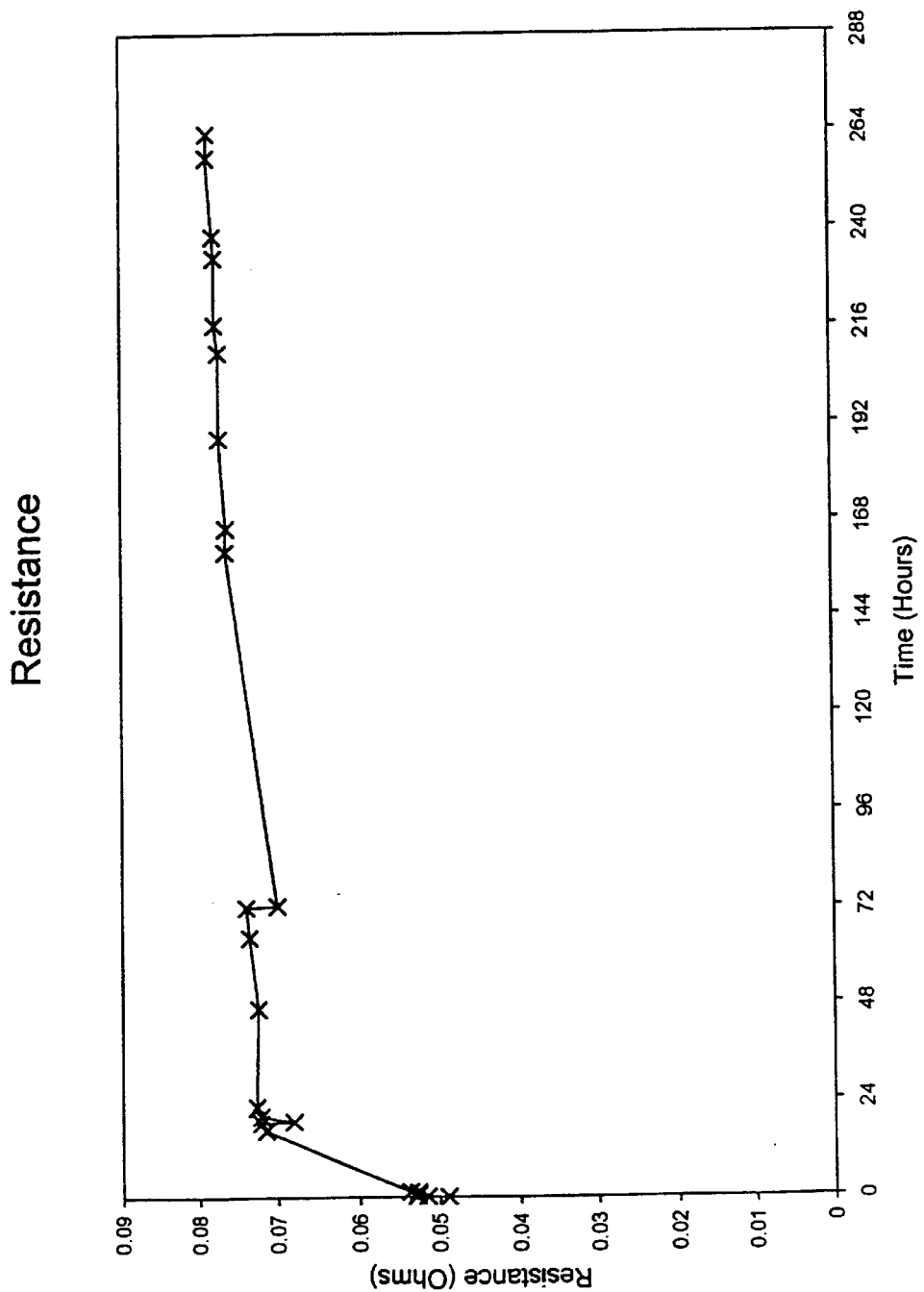
FIG. 13 shows resistance data for the strip heater of FIG. 11 as a function of time.
Figure 14:
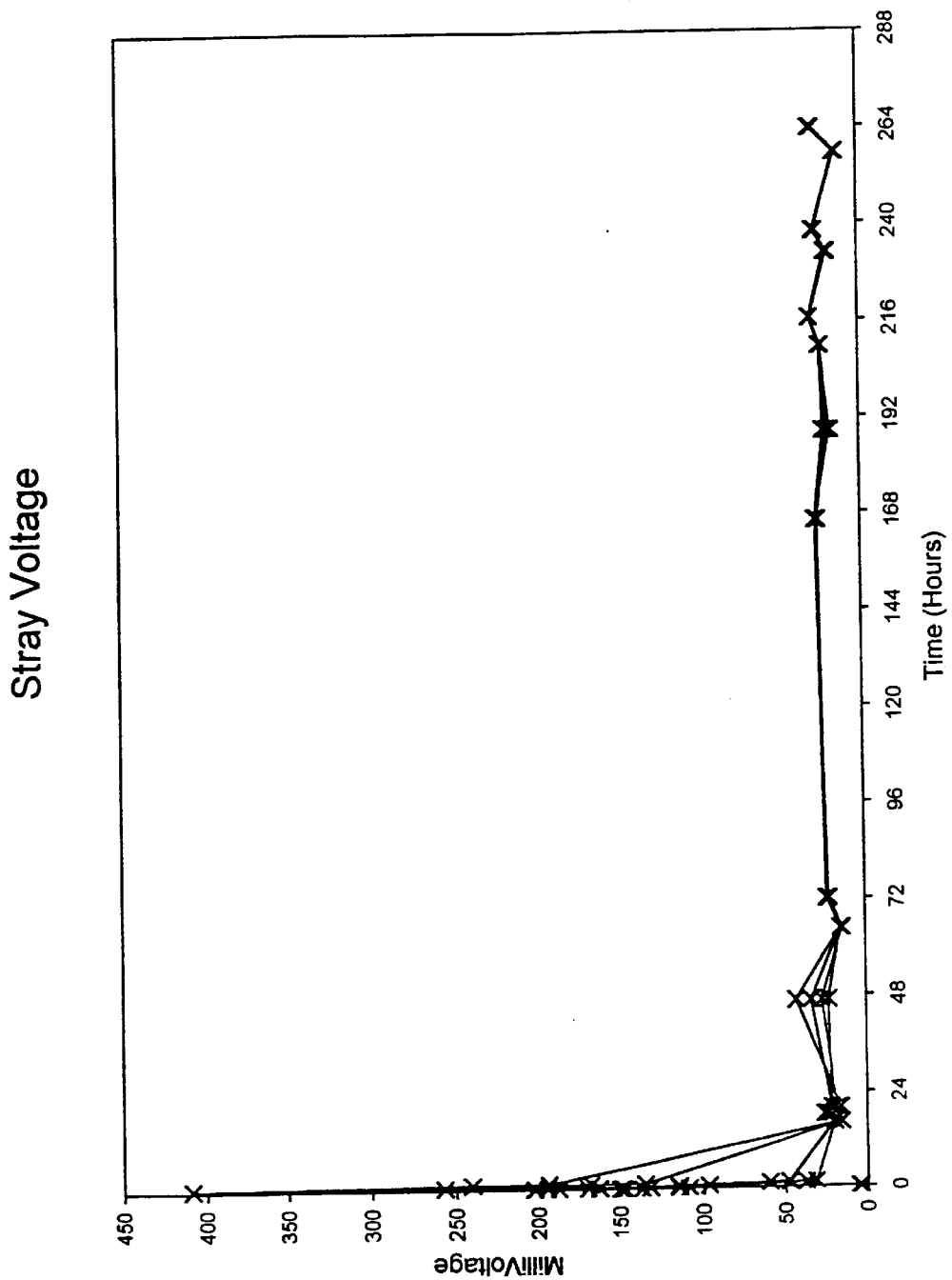
FIG. 14 shows potential voltage near the strip heater of FIG. 11 as a function of time.

FIG. 11 shows electrical data for a strip heater 20 positioned within a heater well 50 for an eleven day test. The power started at about 500 W/ft and decreased to a steady state value of about 380 W/ft after about 20 hours of operation. The decrease in the power reflects heating and drying of the sand and soil adjacent to the strip heater 20. FIG. 12 shows the temperature rise of the strip heater 20 as measured by a thermocouple positioned between legs 52 of the strip heater. FIG. 13 shows the calculated increase in resistance of the strip heater 20 as a function of time. As the resistance increases over the first 20 hours, the power dissipation of the heater section 26 decreases. An increase in resistance may also be a result of corrosion metal loss. However, very little corrosion was observed after more than 10 days of operation. FIG. 14 shows values of ground potential measured at copper stakes located 7-inches and 14-inches away from the heater. The initial ground potential was only 0.5 V, and it decreased to a background level of 40 mV after about 20 hours of operation when the sand and soil dried out. The dry sand and soil were excellent electrical insulators.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A thermal soil remediation system for removing contaminants from soil, comprising:

a plurality of strip heaters in the soil;

a plurality of vacuum wells comprising perforated casings;

high temperature hoses configured to couple the perforated casings to a vacuum manifold that comprises plastic piping, wherein the high temperature hoses convey heated off-gas removed from the soil to the vacuum manifold; and wherein one of the strip heaters comprises a first heater section and a second heater section, and wherein a cross-sectional area of the first heater section is less than a cross-sectional area of the second heater section so that the first heater section generates more heat than the second heater section during use, and wherein at least the first heater section has a substantially rectangular cross section.

2. The system of claim 1, wherein a material of construction of the high temperature hoses and a material of construction of the vacuum manifold inhibits corrosion by decomposition products of contaminants that are generated by thermal decomposition from heat provided by the strip heaters.

3. The system of claim 1, wherein a material of construction of the high temperature hoses and a material of construction of the vacuum manifold inhibits corrosion by HCl (hydrogen chloride).

4. The system of claim 1, wherein a casing of a vacuum well is positioned between legs of a strip heater.

5. The system of claim 1, wherein the strip heater having the first heater section and the second heater section is formed in a U shape, and wherein the first heater section is located at the bottom of the U-shaped strip heater.

6. The system of claim 1, wherein at least one of the strip heaters is positioned in a trench formed in the soil.

7. The system of claim 1, wherein at least one of the hoses comprises reinforcement to inhibit collapse of the hose when vacuum is drawn on the soil through the hose.

8. The system of claim 1, wherein the vacuum manifold comprises chlorinated polyvinyl chloride piping.

9. The system of claim 1, wherein lengths of the hoses provide residence times in the hoses for hot off-gas flowing in the hoses, and wherein the residence times allow the vapor to cool at least to temperatures that will inhibit temperature of the vacuum manifold from exceeding an upper working temperature limit of the vacuum manifold.

10. The system of claim 1, further comprising a treatment facility coupled to the vacuum manifold, wherein the treatment facility is configured to reduce contamination in the off-gas to an acceptable level.

11. A thermal soil remediation system for removing contaminants from soil, comprising:

a plurality of strip heaters in the soil;

a plurality of vacuum wells comprising perforated casings;

high temperature hoses configured to couple the perforated casings to a vacuum manifold that comprises plastic piping, wherein the high temperature hoses convey heated off-gas removed from the soil to the vacuum manifold; and wherein at least one of the strip heaters comprises a U-shaped strip, and wherein a cross-sectional shape of the at least one strip heater is rectangular.

12. The system of claim 11, further comprising one or more insulated centralizers, wherein the one or more insulated centralizers are positioned between the perforated casings and the strip heaters, and wherein the perforated casings are positioned between legs of the strip heaters.

13. The system of claim 11, wherein the perforated casings are configured such that the vacuum wells draw vapor into the perforated casings, and wherein the vapor is removed as off-gas from the soil.

14. The system of claim 11, further comprising an impermeable barrier, wherein the impermeable barrier is configured to limit an amount of air drawn into the soil.

15. The system of claim 14, further comprising a thermal barrier, wherein the thermal barrier is configured to inhibit thermal degradation of the impermeable barrier.

16. The system of claim 11, further comprising a thermal barrier.

17. The system of claim 11, further comprising an external casing, wherein the external casing is configured to inhibit current leakage in soil.

18. The system of claim 11, further comprising:

an external casing for a strip heater of the strip heaters; and fill material, wherein the fill material is positioned adjacent to the external casing and the strip heater.

19. The system of claim 18, wherein the fill material is configured to promote thermal degradation of the contaminants in the soil.

20. The system of claim 11, wherein a material of construction of the high temperature hoses and a material of construction of the vacuum manifold inhibits corrosion by decomposition products of contaminants that are generated by thermal decomposition from heat provided by the strip heaters.

21. The system of claim 11, wherein at least one strip heater is positioned in the soil by vibrating the strip heater into the soil.

22. The system of claim 11, wherein a strip heater of the strip heaters comprises a first heater section and a second heater section, and wherein a cross-sectional area of the first heater section is less than a cross-sectional area of the second heater section so that the first heater section generates more heat than the second heater section during use.

23. The system of claim 11, further comprising a treatment facility coupled to the vacuum manifold, wherein the treatment facility is configured to reduce contamination within the off-gas to an acceptable level.

24. A thermal soil remediation system for removing contaminants from soil, comprising:

strip heaters, wherein at least a portion of each strip heater is positioned in the soil;

vacuum wells comprising perforated casings;

high temperature hoses configured to couple the perforated casings to a vacuum manifold that comprises plastic piping, wherein the high temperature hoses convey heated off-gas removed from the soil to the vacuum manifold, and wherein lengths of the hoses provide residence times for hot off-gas flowing in the hoses, and wherein the residence times allow the vapor to cool at least to temperatures that will inhibit temperature of the vacuum manifold from exceeding an upper working temperature limit of the vacuum manifold; and insulated centralizers positioned between the perforated casings and the strip heaters, and wherein the perforated casings are positioned between legs of the strip heaters;

wherein one or more of the strip heaters comprise a first heater section and a second heater section, and wherein a cross-sectional area of the first heater section is less than a cross-sectional area of the second heater section so that first heater section generates more heat than the second heater section during use.

25. The system of claim 24, wherein the vacuum wells are configured to draw vapor into the perforated casings, and wherein the vapor is removed as off-gas from the soil.

26. The system of claim 24, further comprising a thermocouple positioned in one of the perforated casings.

27. The system of claim 24, further comprising a barrier that is substantially impermeable to air and water, and wherein the barrier is positioned at or near a soil-air interface.

28. The system of claim 24, further comprising a thermal barrier positioned near or at a soil-air interface.

29. The system of claim 24, further comprising a first barrier substantially impermeable to air and water, a second barrier which is a thermal barrier, wherein the second barrier is configured to inhibit vapor from condensing on the first barrier, and wherein the first barrier and the second barrier are positioned near or at a soil-air interface.

30. The system of claim 24, further comprising a treatment facility coupled to the vacuum manifold, wherein the treatment facility is configured to reduce contamination in the off-gas to an acceptable level.

* * * * *